US009226299B1

(12) United States Patent
Marupaduga et al.

(10) Patent No.: US 9,226,299 B1
(45) Date of Patent: Dec. 29, 2015

(54) DYNAMIC FREQUENCY ASSIGNMENT BASED ON BOTH THE DISTANCE FROM ENODEB AND THE LOSS OF A BAND-PASS FILTER

(71) Applicant: Sprint Spectrum L.P., Overland Park, KS (US)

(72) Inventors: Sreekar Marupaduga, Overland Park, KS (US); John W. Prock, Raymore, MO (US); Andy M. Wurtenberger, Olathe, KS (US); Patrick J. Schmidt, Bonner Springs, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/487,588

(22) Filed: Sep. 16, 2014

(51) Int. Cl.
*H04W 72/00* (2009.01)
*H04W 72/04* (2009.01)

(52) U.S. Cl.
CPC .................................. *H04W 72/048* (2013.01)

(58) Field of Classification Search
CPC ....... H04B 1/10; H04W 88/02; H04W 72/048
See application file for complete search history.

(56) References Cited

U.S. PATENT DOCUMENTS

| | | | | |
|---|---|---|---|---|
| 5,715,527 A * | 2/1998 | Horii | ..................... | H03G 3/3042 455/126 |
| 5,995,851 A * | 11/1999 | Lim | .......................... | H04B 1/38 343/872 |
| 6,061,568 A * | 5/2000 | Dent | ......................... | H04J 1/12 455/114.2 |
| 6,658,263 B1 * | 12/2003 | Ke et al. | .................. | H01P 1/213 333/126 |
| 6,738,609 B1 * | 5/2004 | Clifford | ................. | H04B 1/123 342/417 |
| 2002/0164970 A1 * | 11/2002 | Seo | .......................... | H04B 1/10 455/296 |
| 2003/0092577 A1 * | 5/2003 | Hey-Shipton | ......... | H01P 1/2136 505/210 |
| 2007/0077890 A1 * | 4/2007 | Drabeck | ................ | H04B 17/27 455/67.11 |
| 2011/0227664 A1 * | 9/2011 | Wyville | ............... | H03H 11/344 333/17.1 |
| 2012/0314734 A1 * | 12/2012 | Zierdt | .................. | H03H 7/0115 375/219 |
| 2013/0162374 A1 * | 6/2013 | Tamiazzo | ............ | H01P 1/20309 333/202 |
| 2014/0153498 A1 * | 6/2014 | Rousu | ..................... | H04W 8/24 370/329 |

\* cited by examiner

*Primary Examiner* — Kenneth Lam (57) ABSTRACT

During a communication session, a filter in the RAN may filter signals sent over the communication pathway. When the filter filters signals sent over communication pathway, it may also cause some filter loss in the signals. The amount of the filter loss may vary as a function of frequency. Before the start of a communication session, the RAN may determine a filter loss for a given frequency. Because a higher filter loss indicates the RAN will transmit (or receive) a weaker signal, it may be undesirable to transmit signals to WCDs that are located a far distance from the RAN with frequencies having high filter losses. Thus, once the RAN has determined a filter loss for a given frequency, the RAN may reserve the given frequency for use in communication between the RAN and at least one WCD based on a distance between the WCD and the RAN.

20 Claims, 6 Drawing Sheets

DYNAMIC FREQUENCY ASSIGNMENT BASED ON BOTH THE DISTANCE FROM ENODEB AND THE LOSS OF A BAND-PASS FILTER

BACKGROUND

Unless otherwise indicated herein, the description provided in this section is not itself prior art to the claims and is not admitted to be prior art by inclusion in this section.

To provide cellular wireless communication service, a wireless service provider typically operates a radio access network (RAN) that includes a number of base stations that radiate to define wireless coverage areas, such as cells and cell sectors, in which wireless communication devices (WCDs) such as cell phones, tablet computers, tracking devices, embedded wireless modules, and other wirelessly-equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the RAN may engage in air interface communication with a base station and may thereby communicate via the base station with various remote network entities or with other WCDs served by the base station.

In general, a RAN may operate in accordance with a particular air interface protocol or "radio access technology," with a communication pathway from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), and Global System for Mobile Communications (GSM), among others. Each protocol may define its own procedures for registration of WCDs, initiation of communications, handoff between coverage areas, and functions related to air interface communication.

In accordance with the air interface protocol, each coverage area may operate on one or more carrier frequencies or blocks of frequencies (e.g., frequency bands, such as 698-960 MHz, 1610-2025 MHz, etc.) and may define a number of air interface channels for carrying information between the base station and WCDs. These channels may be defined in various ways, such as through frequency division multiplexing, time division multiplexing, and/or code-division multiplexing, for instance. By way of example, each coverage area may define a pilot channel, reference channel, or other resource on which the base station may broadcast a pilot signal, reference signal, or the like that WCDs may detect as an indication of coverage and may measure to evaluate coverage strength. As another example, each coverage area may define one or more uplink control channels or other resources on which WCDs may transmit control messages to the base station. And each coverage area may define one or more downlink control channels or other resources on which the base station may transmit control messages or other information to WCDs.

Further, each coverage area may define one or more traffic channels or other resources for carrying bearer communication traffic such as (e.g., user traffic or application level traffic) as voice data and other data between the base station and WCDs. Additionally, each link between the BTS and WCD may operate independently from the other links. And, each link between the BTS and WCD may operate on a frequency that is different from the frequency on which each other link operates.

When a WCD first powers on or enters into a base station's coverage area, the WCD may register with the RAN in that coverage area by transmitting a registration request, such as an attach request, to the base station serving that coverage area. The attach request may cause the base station or associated infrastructure to authenticate and authorize the WCD for service by the base station and to reserve network resources for use to serve the WCD. In particular, the attach request may result in setup of one or more logical bearer connections extending in the network between the base station and one or more transport networks and extending over the air interface as a radio link between the base station and the WCD.

Once the WCD is attached with a base station, the WCD may operate in a connected mode or an idle mode. In the connected mode, the WCD may engage in communication of bearer data (e.g., application layer communications, such as SIP signaling, voice communication, video communication, file transfer, gaming communication, or the like), transmitting bearer data on uplink traffic channel resources to the base station and receiving bearer on downlink traffic channel resources from the base station.

OVERVIEW

A base transceiver station (BTS) may be configured to communicate with at least one WCD over a communication pathway. As noted above, the communication pathway includes (i) a downlink where the RAN sends data to the WCD and (ii) an uplink where the WCD sends data to the RAN. Both the downlink and the uplink of the communication pathway have at least one respective communication frequency to facilitate communication between the WCD and the RAN. Additionally, all the communication frequencies of the communication pathway may be located within a predefined frequency bandwidth of the RAN.

During a communication session, a filter in the RAN may filter signals sent over the communication pathway. The filter in the RAN may be configured as a band-pass filter, a filter that passes frequencies within the frequency bandwidth of the RAN and blocks frequencies outside the frequency bandwidth of the RAN. When the filter passes signals sent over communication pathway, it may also cause some filter loss, also known as insertion loss, in the signals. The amount of the filter loss may vary as a function of frequency. For example, near the edges of the frequency bandwidth, the insertion loss may be higher than near the center of the frequency bandwidth. The filter loss causes signals transmitted or received by the RAN to be weaker than the signals would have been without the presence of the filter loss.

Before the start of a communication session, the RAN may determine a filter loss for a given frequency. Because a higher filter loss causes the RAN to transmit (or receive) a weaker signal, it may be undesirable to transmit signals to WCDs that are located a far distance from the RAN with frequencies having high filter losses. Conversely, because a lower filter loss causes the RAN to transmit (or receive) a stronger signal compared to signals sent with a frequency having higher filter loss, it may be desirable to transmit signals to WCDs that are located a far distance from the RAN with frequencies having low filter losses. Thus, once the RAN has determined a filter loss for a given frequency, the RAN may reserve the given frequency for use in communication between the RAN and at least one WCD based on a distance between the at least one WCD and the RAN.

In some scenarios, the RAN may be configured to determine a distance class for a WCD, such as a "near" distance class or a "far" distance class. The RAN may determine the distance class by calculating the distance between itself and the WCD. In one example, the RAN may calculate the distance to the WCD based on a received strength of a signal the WCD received from the RAN. In another example, the RAN may calculate the distance to the WCD based on a received signal strength of a signal the RAN received from the WCD. In yet another example, the RAN may calculate the distance to the WCD based on a received location of the WCD. In further examples, the RAN may use other methods to calculate the distance between the RAN and the WCD.

The RAN may use the reserved frequencies to communicate with the WCD when the WCD meets certain distance criteria. When the WCD meets the certain distance criteria, the WCD may have a specified distance class. During the operation of the RAN, when a WCD has a distance class associated with the reserved frequency, the RAN and the WCD may communicate with the reserved frequency. Whereas, when a WCD has a distance class that is not associated with the reserved frequency, the RAN and the WCD may communicate with frequencies other than frequencies reserved by the RAN.

To facilitate communication with WCDs, the RAN may reserve frequencies in at least one of two ways. In the first example, the RAN reserves low-loss frequencies for WCDs having a far distance class. In the second example, the RAN reserves high-loss frequencies for WCDs having a near distance class. Additionally, in some examples, the RAN may simultaneously reserve low-loss frequencies for WCDs having a far distance class and reserve high-loss frequencies for WCDs having a near distance class.

In the first example, the RAN may determine that a filter has a low loss for a given frequency and responsively reserve the given frequency for WCDs having a far distance class. After reserving the frequency for WCDs having a far distance class, if a WCD is in the far distance class, the RAN may use the reserved low-loss frequency to communicate with the WCDs. Conversely, in the second example, the RAN may determine that a filter has a high loss for a given frequency and responsively reserve the given frequency for WCDs having a near distance class. After reserving the frequency for WCDs having a near distance class, if a WCD is in the near distance class, the RAN may use the reserved high-loss frequency to communicate with the WCD.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

I. Example Communication System Architecture

Figure 1:
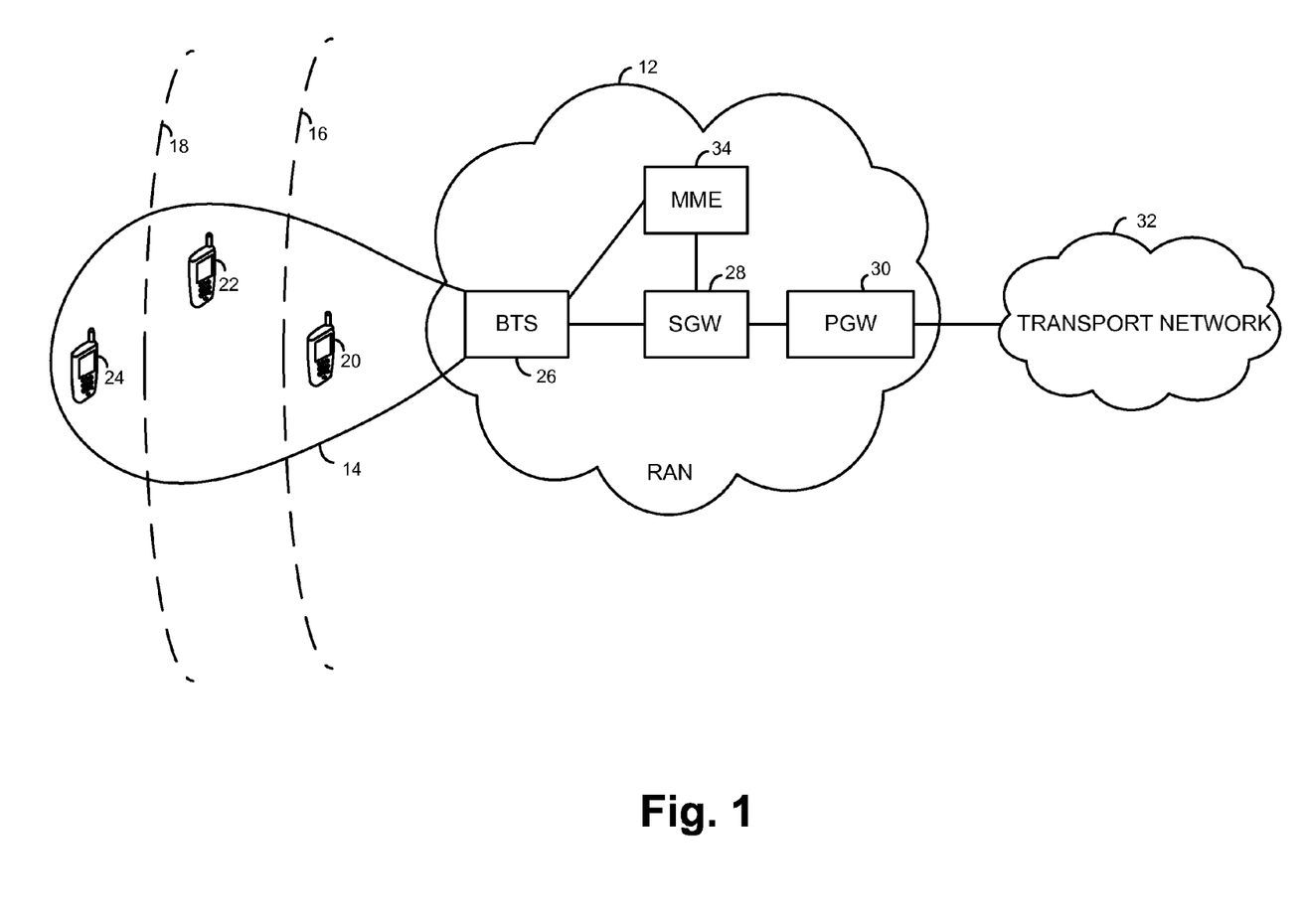
FIG. 1 is a simplified block diagram of a communications network.

Referring to the drawings, FIG. 1 is a simplified block diagram of a communications network in which at least one embodiment of the present method can be implemented. It should be understood, however, that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. In addition, various functions described herein as being performed by one or more entities may be carried out by hardware, firmware, and/or software. For instance, a processor executing program instructions stored in memory or another such non-transitory machine-readable medium may carry out various functions.

As shown in FIG. 1, an exemplary network includes at its core a RAN 12 that radiates to define at least one wireless coverage area, including representative coverage area 14. Shown operating in the coverage area by way of example are WCDs 20, 22, 24, that communicate over the air with the RAN 12. Each of WCDs 20, 22, and 24 is shown having a different distance class as indicated by threshold distances 18 and 16. In accordance with the present method, the RAN will determine a distance class for each WCD based on a distance between each WCD and the RAN.

As depicted in FIG. 1, the RAN may have two distance thresholds. The RAN may use these thresholds as a basis to designate a WCD as being either "near" to the RAN or "far" from the RAN. For instance, the RAN may determine if a WCD is located near to the RAN based on the first distance threshold 16. Thus, as shown in FIG. 1, representative WCD 20 is located closer than threshold 16 to the RAN, so the RAN may consider the WCD 20 to be located near to the RAN. Similarly, the RAN may determine if a WCD is located far from the RAN based on second distance threshold 18. Thus, as shown in FIG. 1, representative WCD 24 is located further than threshold 18 from the RAN, so the RAN may consider the WCD 24 to be located far from the RAN.

Additionally, the RAN may have a range of distances located between the first distance threshold 16 and the second distance threshold 18. This range of distances located between the two threshold corresponds to a range where the RAN will not consider WCDs in the range to be part of either the near or far distance classes. Further, as shown in FIG. 1, WCD 22 is located between the first distance threshold 16 and second distance threshold 18. Therefore, the RAN may consider WCD 22 located neither near nor far from the RAN.

Although FIG. 1 is shown with both first distance threshold 16 and second distance threshold 18, it is not a requirement for a RAN to have two distance thresholds. For example, the RAN may use a single distance threshold to determine which WCDs are located near to the RAN. In other examples, the RAN may use a single distance threshold to determine which WCDs are located far from the RAN. Thus, in various examples, the RAN may either use one or two distance thresholds (or a greater number of thresholds) to determine the distance class of the various WCDs.

Yet further, the RAN may be configured to set distance thresholds in multiple ways. In a first example, the RAN may have one or more static predetermined distance thresholds. Static predetermined distance thresholds may not vary with time. However, in another example, the distance thresholds may be varied. The RAN may vary the distance thresholds itself or a remote system may send a command to the RAN to vary the distance thresholds. The RAN (or remote system) may use various criteria to vary the distance thresholds. For example, the RAN may determine distance thresholds based on a number of WCDs the RAN is servicing, the location(s) of various WCDs the RAN is servicing, and/or other criteria.

RAN 12 can generally take any form, the particular details of which are not critical to this disclosure. At a rudimentary level, for instance, the RAN may comprise a simple wireless access point router or switch, which communicates on one side with served WCDs and connects on the other side with the transport network, or merely provides connectivity between WCDs.

At a more complex level (as shown), but still by way of example, the RAN may be a cellular radio access network. As shown, such a network may have a BTS (e.g., access node, node-B, eNodeB (eNB), or the like), including a representative BTS 26 that provides antenna elements that radiate to define a coverage area and perhaps a set of coverage areas. In one example, coverage area 14 may correspond with an area defined by a radiation pattern of BTS 26.

The BTS 26 then has a communication interface with a mobility management entity (MME) 34 that functions as a signaling controller for the LTE network. Further, the BTS 26 has a communication interface with a serving gateway (SGW) 28, which in turn has a communication interface with a packet-data network gateway (PGW) 30 that provides connectivity with a transportation network 32, and the MME 34 has a communication interface with the SGW 28. In practice, the illustrated components of the LTE network may sit as nodes on a private packet-switched network owned by an operator of the LTE network, and thus the various communication interfaces may be virtual interfaces through that network.

RAN 12 may operate according to an OFDM protocol such as IEEE 802.11 (WiFi) systems, IEEE 802.16 (WiMAX) systems, LTE systems, and/or any other wireless protocol or protocols now known or later developed. In embodiments where the RAN 12 operates as part of an LTE system, the RAN may be an LTE eNB base station.

II. Example Network Device

Figure 2:
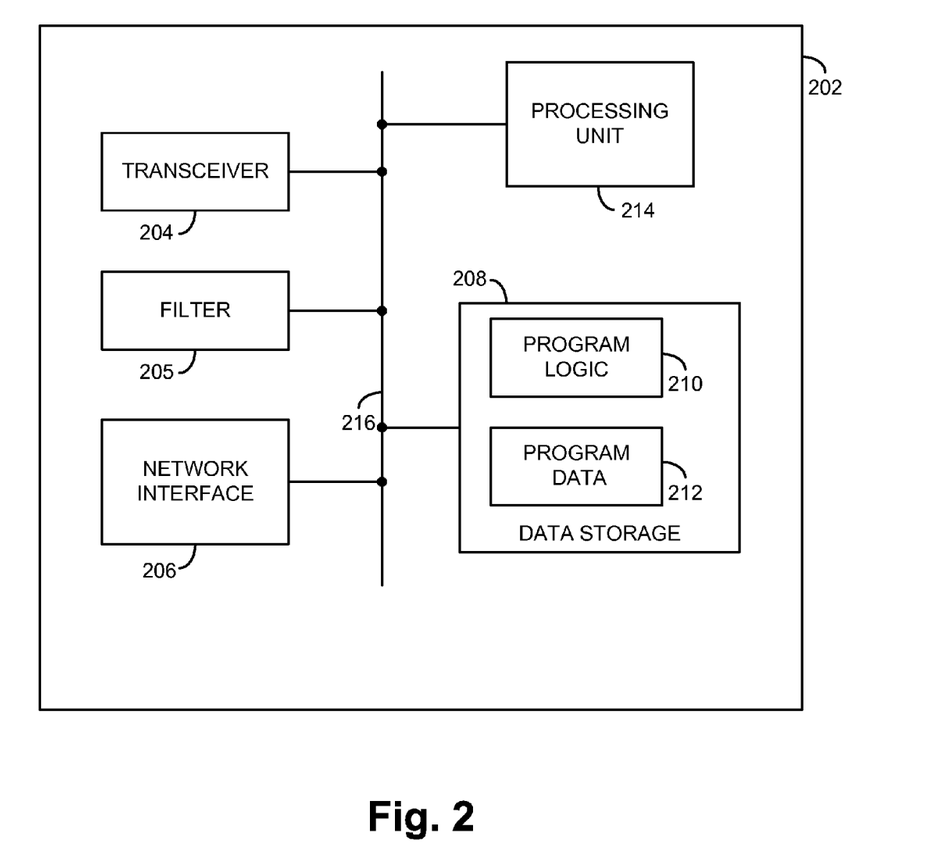
FIG. 2 is a simplified block diagram depicting functional components of an example network device.

Those skilled in the art will appreciate that there can be numerous specific implementations of a network device that may be used in connection with at least one embodiment of the method described herein. By way of example, FIG. 2 is a simplified block diagram depicting functional components of an example network device or system 202 that may be arranged to carry out network-side functions described herein.

The example network device 202 may be representative of BTS 26, SGW 28, PGW 30, MME 34, MME 34 integrated with BTS 26, and/or some other entity associated with transport network 32 in FIG. 1, for instance. As shown in FIG. 2, network device 202 includes a transceiver 204, a filter 205, a network interface 206, a processing unit 214, and data storage 208, all of which may be coupled together by a system bus 216 or other mechanism. In addition, the network device may also include external storage, such as magnetic or optical disk storage, although this is not shown in FIG. 2.

These components may be arranged to support conventional operation of BTS 26, SGW 28, MME 34, and/or PGW 30 in a wireless-communication network, such as RAN 12 illustrated in FIG. 1.

Transceiver 204 may include one or more antennas that radiate to define a coverage area (e.g., coverage area 14) in which WCDs may operate. Transceiver 204, in combination with network interface 206, may enable the network device 202 to communicate with WCDs on a network, such as RAN 12. For example, network interface 206, in combination with transceiver 204, may enable network device 202 to transmit forward-link communications to WCDs, and receive reverse-link communication from WCDs. Network interface 206 may take the form of a trunk or optical link that can be coupled with PGW 30, or any Ethernet network interface card or other physical connection that can be coupled with any other entity on the RAN 12 or transport network 32. By way of example, the interface 206 may include a module, such as an LTE chipset, and may support wireless packet-data communications according to LTE modulation schemes.

In various examples, the filter 205 may be either an independent component or a component integrated within another component, such as either the transceiver 204 or the network interface 206. By way of example, the filter 205 may be configured to filter at least one of the forward-link communication and the reverse-link communication. By filtering the forward-link communication, the filter may prevent the RAN 12 from transmitting on frequencies on which it should not transmit. Additionally, by filtering the reverse-link communication, the filter may prevent the RAN 12 from receiving on frequencies on which it should not receive.

Processing unit 214 may comprise one or more general-purpose processors (e.g., INTEL microprocessors) and/or one or more special-purpose processors (e.g., dedicated digital signal processor, application-specific integrated circuit, etc.) and may be integrated in whole or in part with the transceiver 204 and/or with other RAN components. In turn, the data storage 208 may comprise one or more volatile and/or non-volatile storage components, such as magnetic or optical memory or disk storage. Data storage 208 can be integrated in whole or in part with processing unit 214, as cache memory or registers for instance. As further shown, data storage 208 is equipped to hold program logic 210 and program data 212. Program logic 210 may comprise machine-language instructions that define routines executable by processing unit 214 to carry out various functions described herein. Additionally, program data 212 may comprise reference data established and/or used during the execution of program logic 210 by processing unit 214.

III. Example Filtering Bandwidth

As previously discussed, a RAN may filter the forward-link communication and/or the reverse-link communication between the RAN and a WCD. In some examples, the RAN may have a first filter, or first set of filters, configured to filter the forward-link communication and a second filter, or second set of filters, configured to filter the reverse-link communication. The filtering terminology and general operation is the same, regardless of whether filtering is of the forward-link communication or the reverse-link communication.

Figure 3A:
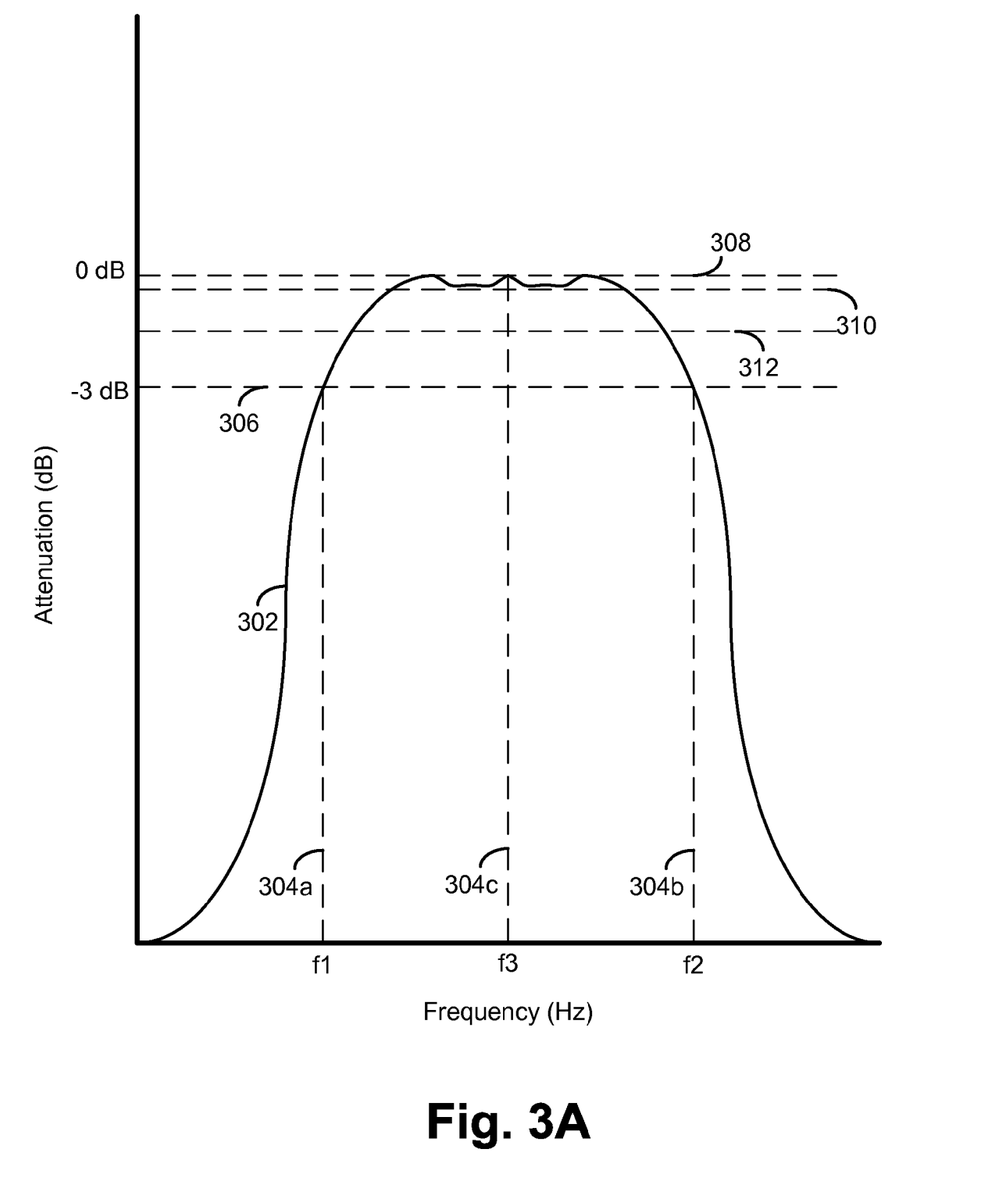
FIG. 3A is a simplified example of a filtering bandwidth for use in a communication network.

FIG. 3A is a simplified example of a filtering bandwidth for a filter (such as filter 205 of FIG. 2) for use by a RAN in a communication network. As shown in FIG. 3A, the filter may be a band-pass filter. As previously discussed, a band-pass filter is a filter that is configured to pass signals having a frequency within a filter bandwidth and to attenuate (or block) signals having frequencies outside of the filter bandwidth.

FIG. 3A shows an example filtering bandwidth having an attenuation curve 302. The attenuation curve 302 shows the filter loss (i.e., insertion loss) of the filter as a function of frequency (i.e., how much the filter will attenuate a signal applied to the filter at a given frequency). Line 308 indicates 0 decibels (dB) filter loss, meaning the signal is freely passed with no filter loss caused by the filter.

An ideal filter would have 0 dB of filter loss across the frequencies within the filtering bandwidth and complete attenuation across the frequencies outside the filtering bandwidth. However, an ideal filter is impossible to create in the real world. Consequently, a real-world filter that can be created will not have the same ideal parameters as the ideal filter. For example, a real-world filter will have filter losses that vary with the frequency of the signal being filtered. In practice, near the center of the filtering bandwidth a real-world filter may have lower filter losses than near the edges of the filtering bandwidth. Additionally, some real world filters may have high loss frequencies that are not located near the edges of the filtering bandwidth.

The filtering bandwidth may have a lower bound 304a. The lower bound 304a may correspond to a frequency f1. Additionally, the lower bound may be determined based on a pre-determined filter loss 306. In some examples, the pre-determined filter loss 306 may be −3 dB. In alternate examples, the pre-determined filter loss that determines the filter bandwidth may be different than −3 dB. In any event, the lower frequency f1 where the attenuation curve 302 crosses the pre-determined filter loss 306 line is the lower bound 304a of the filtering bandwidth.

Further, the filtering bandwidth may have a corresponding upper bound 304b. The upper bound may correspond to a frequency f2. Similar to the lower bound 304a, the upper bound may be calculated based on the pre-determined filter loss 306. Thus, the higher frequency f2 where the attenuation curve 302 crosses the pre-determined filter loss 306 line is the upper bound 304b of the filtering bandwidth. Further, the filtering bandwidth may also have a center 304c corresponding to frequency f3. The frequency f3 at the center 304c of the filtering bandwidth may correspond to the average of the upper bound and lower bound frequencies (i.e., f1+f2/2).

Figure 3B:
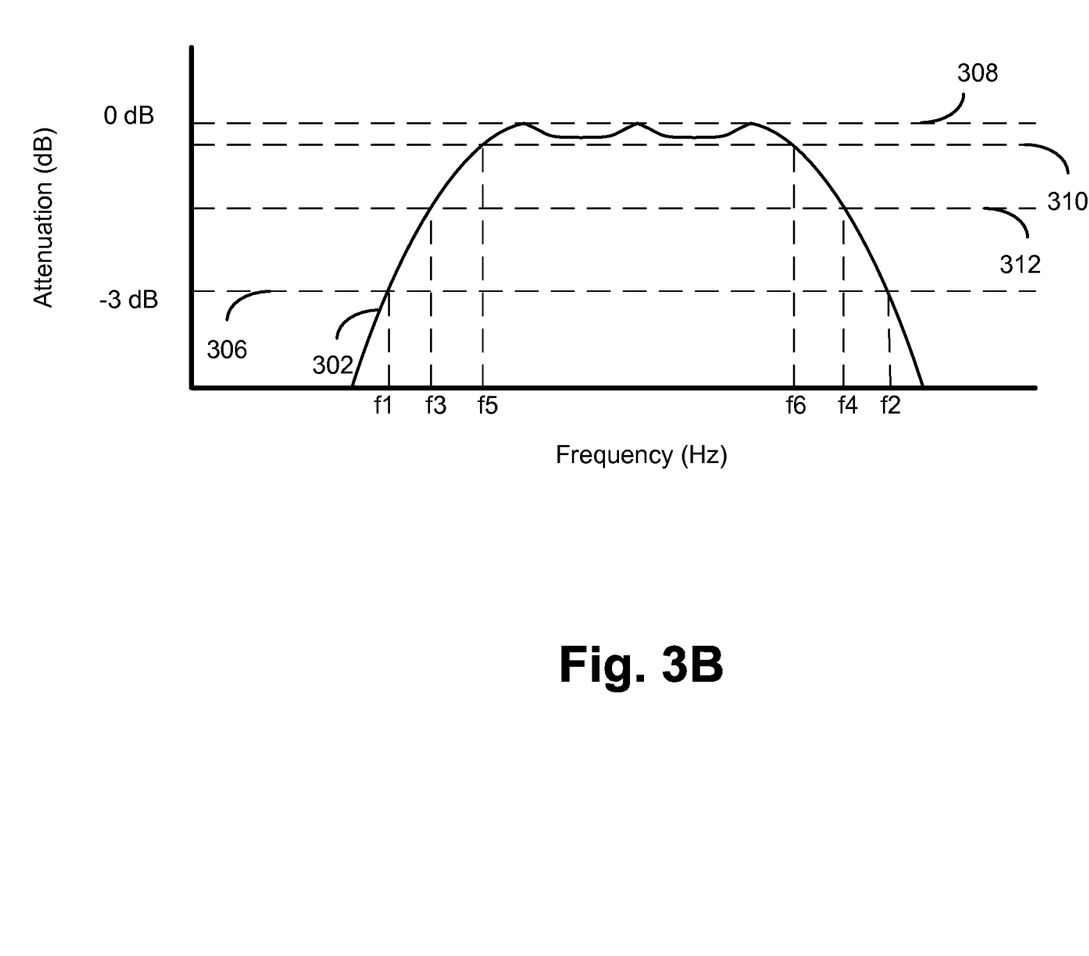
FIG. 3B is a simplified example of an exploded view of a filtering bandwidth for use in a communication network.

Additionally, the filter may have at least one region of frequencies that have low filter loss, and the filter may have at least one region of frequencies that have high filter loss. For example, a low filter loss limit 310 may be −0.5 dB. However, in other examples, the low filter loss limit 310 may have a different threshold filter loss. FIG. 3B depicts a simplified example of an exploded view of the filtering bandwidth of a filter. The frequencies that correspond to portions of the attenuation curve 302 that are above filter loss limit 310 may be frequencies where the filter is determined to have low filter loss (e.g., frequencies corresponding to points on the attention curve 302 located between low filter loss limit 310 and 0 dB loss line 308 may be low filter loss frequencies). As depicted in FIG. 3B, the frequencies with low filter loss may be the frequencies located between f5 and f6.

Conversely, a threshold filter loss may be chosen as a limit on high filter loss. For example, a high filter loss limit 312 may be −1.3 dB. However, in other examples, the high filter loss limit 312 may have a different threshold filter loss. The frequencies that correspond to portions of the attenuation curve 302 that are below filter loss limit 312 may be frequencies where the filter is determined to have high filter loss. As depicted in FIG. 3B, the frequencies with high filter loss may be the frequencies located between f1 and f3 and the frequencies located between f4 and f2.

The BTS (or other component of the RAN) may be programmed to either dynamically or programmatically define the threshold levels for low filter loss and high filter loss. In one example, the RAN may dynamically define threshold levels based on the number of WCDs and the distance of the various WCDs in communication with the RAN. In another example, the RAN may programmatically define the threshold levels based on an analysis of the filter parameters. In another example, the threshold levels may be defined based on pre-determined threshold levels for low filter loss and high filter loss. For instance, the filter may have predefined specifications, which may correspond with these levels. In another example, the network operator may set the threshold filter loss levels. The network operator may set the threshold filter loss levels based the configuration of the network, filter parameters, or other criteria.

The filter loss of the filter may affect the performance of the communication system by reducing a transmission power of a signal transmitted by the RAN. The higher the transmission power of a signal from the RAN is the longer the distance at which the RAN and a WCD may communicate. Therefore, because a higher filter loss means the RAN transmits a weaker signal, the distance at which the RAN and the WCD can communicate may be shorter for high filter loss frequencies than for lower filter loss frequencies. Thus, it may be desirable to dynamically assign frequencies to WCDs based on both the filter loss associated with the frequency and the distance between the RAN and WCDs.

IV. Dynamic Frequency Assignment Based on a Distance Between a RAN and WCD

Figure 4:
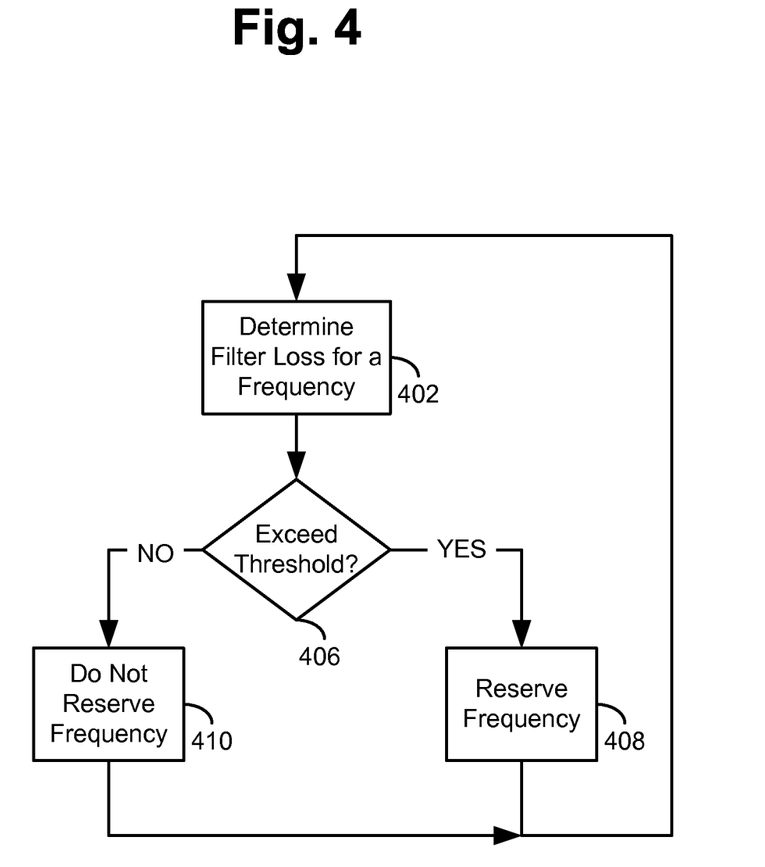
FIG. 4 is a simplified block diagram of a method for dynamic frequency assignment based on both the distance from eNodeB and the loss of a band-pass filter.

FIG. 4 is a simplified block diagram of a method for dynamic frequency assignment based on both the distance from eNodeB and the loss of a band-pass filter. As noted above, a RAN may be configured to reserve frequencies for communication between the RAN and a WCD based on a filter loss corresponding to the respective frequency. FIG. 4 shows a method that the RAN may perform in an iterative manner to determine if a given frequency of a plurality of frequencies should be reserved for communication between the RAN and WCD or not.

At block 402, the RAN may determine a filter loss for frequency. The frequency for which the RAN may determine the filter loss may be one of the plurality of frequencies with which RAN may be configured to communicate with WCDs. The frequencies with which the RAN and the WCD may communicate may be located within the filtering bandwidth of the filter. However, although the frequencies for communication may be located within the filtering bandwidth, as previously discussed, the filter may have filter losses that vary based on the frequency being passed by the filter.

In some embodiments, the RAN may determine the filter loss based on data stored in the RAN. For example, the filter losses, as a function of frequency, may be measured before the filter in installed in the RAN. This measured data may be stored in the RAN as a lookup table. In a different example, the RAN itself may be able to measure the filter losses as a function of frequency. The RAN may measure the filter loss by passing a signal having a predetermined frequency through the filter. The filter loss is equal to the difference between a power level of a signal input to the filter and the power level of the corresponding signal output from the filter.

The RAN may iteratively pass signals corresponding to each frequency on which the RAN may communicate through the filter to measure the filter loss corresponding to each frequency.

At block 406, the RAN may determine if the filter loss for the frequency exceeds a threshold. As noted above, in various examples, the RAN may operate in at least one of two ways at block 406. In the first example, the RAN reserves frequencies for WCDs based on the filter losses being less than a lower threshold limit (i.e., exceeding the threshold means the filter losses being less than the threshold filter loss value). For example, the threshold may be 0.5 dB. Any frequency that has a loss less than the lower threshold limit would be reserved in the first example. In the first example, the RAN may reserve frequencies for WCDs that are located a far distance from the RAN. By reserving the low-loss frequencies for far away WCDs, the RAN may be able to more effectively serve WCDs that are near the edges of the RANs coverage area by assigning the reserved low-loss frequencies to WCDs located far from the RAN.

In the second example, the RAN reserves frequencies for WCDs based on the filter losses being greater than a higher threshold limit (i.e., exceeding the threshold means the filter losses being greater than the threshold filter loss value). For example, the higher threshold limit may be 1.3 dB. Any frequency that has a loss greater than the higher threshold limit would be reserved in the second example. The second example may reserve frequencies for WCDs that are located a close distance to the RAN. By reserving the high-loss frequencies for closely located WCDs, the RAN may be able to more effectively serve WCDs that are near the edges of the RANs coverage area by preventing high loss frequencies from being assigned to WCDs located a far distance from the RAN.

If the filter loss does exceed the threshold, then, at block 408, the RAN will reserve the frequency. By reserving a frequency, the RAN will not use the reserved frequency to communicate with a WCD unless that respective WCD has the corresponding distance class. The RAN determines the corresponding distance class based on which of the two examples (as described with respect to block 406) applies. As previously discussed, in the first example, the RAN will reserve the frequencies for WCDs that are located a far distance from the RAN. In the second example, the RAN will reserve the frequencies for WCDs that are located a near distance to the RAN.

If the filter loss does not exceed the threshold, at block 410, the RAN will not reserve the frequency. Therefore, the RAN may use the unreserved frequency to serve any WCD in communication with the RAN.

After block 408 or 410, the RAN may perform the function of block 402 again to determine the filter loss for a different frequency. The different frequency for which the RAN may determine the filter loss may be a different one of the plurality of frequencies with which RAN may be configured to communicate with WCDs. In one example, the RAN may iteratively adjust the frequency for which it determines the filter loss at block 402 until each frequency with which RAN may be configured to communicate with WCDs has been either reserved or not reserved. In another example, the RAN may have stored data that indicates a filter loss as a function of frequency. The RAN may determine the filter loss at block 402 by mapping the frequencies to respective distance classes based on the stored data.

Figure 5:
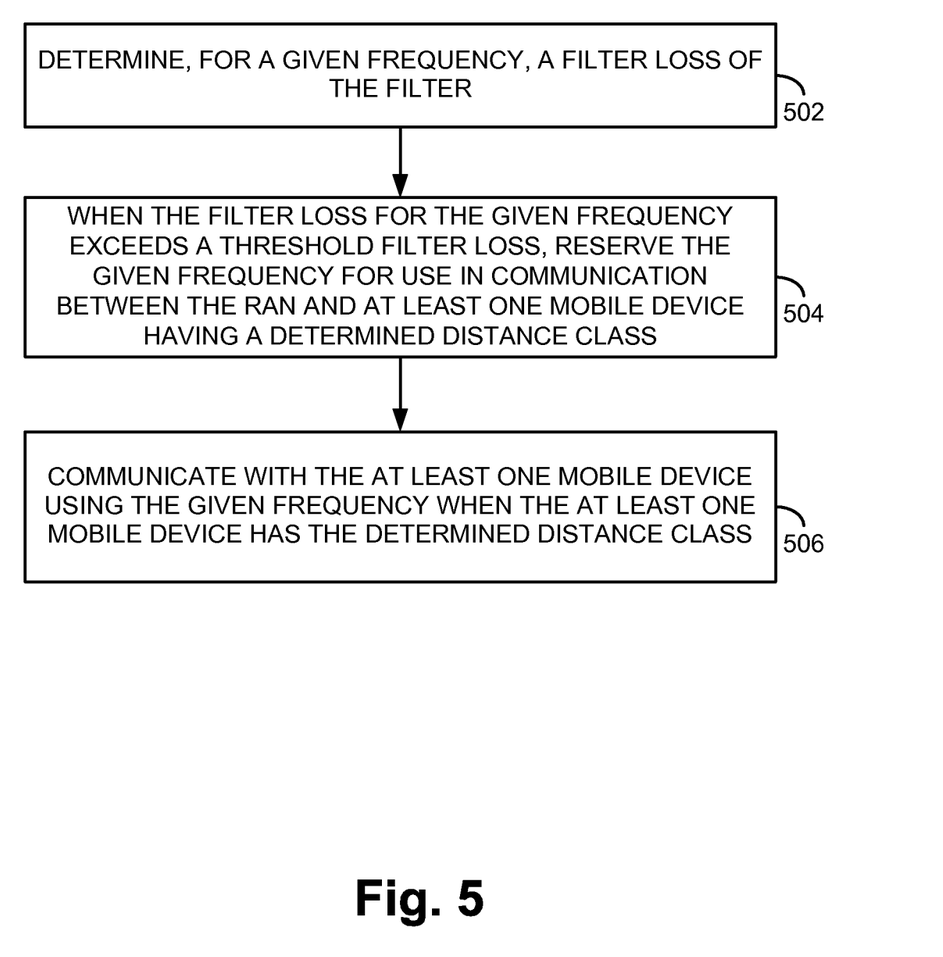
FIG. 5 is a simplified flow diagram of a method for dynamic frequency assignment based on both the distance from eNodeB and the loss of a band-pass filter.

FIG. 5 is a simplified flow diagram of a method for dynamic frequency assignment based on both the distance from eNodeB and the loss of a band-pass filter. At block 502, the RAN may determine, for a given frequency, a filter loss of the filter. And at block 504, when the filter loss for the given frequency exceeds a threshold filter loss, the RAN may reserve the given frequency for use in communication between the RAN and at least one mobile device (e.g., a WCD) having a determined distance class. Blocks 502 and 504 may be performed in a similar manner to blocks 402, 406, and 408 of FIG. 4, as previously discussed.

In an additional example, at blocks 502 and 504 the RAN may perform the functions of blocks 402, 406, and 408 of FIG. 4 repeatedly. The functions of blocks 402, 406, and 408 of FIG. 4 may be performed repeatedly so each frequency with which RAN may communicate with WCDs could be deemed to have one of three states. The first state is the frequency being reserved for WCDs having a far distance class. The second state is the frequency being reserved for WCDs having a near distance class. And, the third state is the frequency not being reserved for WCDs having a distance class.

At block 506, the RAN may communicate with at the least one WCD using the given frequency when the WCD has the determined distance class. Block 506 may include the RAN determining a distance class for the WCD based on the distance between the WCD and the RAN, and, based on that determined distance class, deciding which frequency to used based on the determined filter loss that frequency.

As noted above, the RAN may be configured to determine a distance class for a WCD. The RAN may determine the distance class based on a calculated distance between the RAN and the WCD. In one example, the RAN may calculate the distance to the WCD based on a strength of a signal the WCD received from the RAN. The signal strength received by the WCD may be proportional to the distance the WCD is located from the RAN. In another example, the RAN may calculate the distance to the WCD based on a received signal strength of a signal the RAN received from the WCD. The signal strength received by the RAN may be proportional to the distance the WCD is located from the RAN. In yet another example, the RAN may calculate the distance to the WCD based on a received location of the WCD. The WCD may be able to locate itself with Global Positioning System (GPS), cellular triangulation, or by other means, and report its location to the RAN. The RAN may be able to calculate the distance between the WCD and the RAN based on the RAN knowing its own location and knowing the location reported by the WCD. In further examples, the RAN may use other methods to calculate the distance between the RAN and the WCD.

Once the RAN has determined the distance between itself and the WCD, it may determine if the mobile falls within a distance class. As noted above, the RAN may operate in at least one of two example ways. In the first example, the RAN determines if WCDs are part of a far distance class. In the second example, the RAN determines if WCDs are part of a near distance class. Further, the RAN may also operate in both the first example and the second example at the same time. Therefore, in an example, the RAN may determine if a WCD is (i) part of a near distance class or (ii) part of a far distance class. The RAN may compare the distance between the WCD and the RAN to at least one threshold distance to determine if the WCD falls within the distance class.

As discussed above, the RAN may be configured to set distance thresholds in multiple ways. In a first example, the RAN may have one or more static predetermined distance thresholds. However, in another example, the distance thresholds may be varied. The RAN may vary the distance thresholds itself or a remote system may send a command to the RAN to vary the distance thresholds. The RAN (or remote system) may use various criteria to vary the distance thresholds. For example, the RAN may determine distance thresholds based on a number of WCDs the RAN is servicing, the location of various WCDs the RAN is servicing, or based on other criteria.

Therefore, at block 506, when a WCD has the distance class associated with the reserved frequency, the RAN and the WCD may communicate with the given frequency that the RAN reserved. The RAN and the WCD may communicate with the given frequency until the WCD changes distance class. In some examples, when the WCD changes distance class the RAN will assign the WCD a new frequency based on the changed distance class of the WCD.

V. Conclusion

Example embodiments have been described above. Those skilled in the art will understand, however, that changes and modifications may be made to these embodiments without departing from the true scope of the invention, which is defined by the claims.

What is claimed is:

1. A method performed by a radio access network (RAN), wherein the RAN comprises a filter, the method comprising:
   determining, for a given frequency, a filter loss of the filter, wherein the filter has a varying degree of loss corresponding with frequency;
   in response to the determining that the filter loss for the given frequency exceeds a threshold filter loss, the RAN: (i) reserving the given frequency for use in communication between the RAN and at least one mobile device having a determined distance class, wherein the distance class is determined based on a distance between the at least one mobile device and the RAN, and (ii) communicating with the at least one mobile device using the given frequency when the at least one mobile device has the determined distance class.

2. The method of claim 1, wherein the filter is a band-pass filter.

3. The method of claim 1, further comprising the RAN determining a distance between the RAN and the mobile device.

4. The method of claim 3, wherein the determining is based on a received signal strength of a signal received by the RAN from the mobile device.

5. The method of claim 3, wherein the determining is based on a received signal strength of a signal received by the mobile device from the RAN.

6. The method of claim 3, wherein the determining is based on a received location of the mobile device.

7. The method of claim 1, wherein the filter loss is greater than the threshold filter loss set by the network operator.

8. The method of claim 1, wherein the determined distance class is a distance class greater than a threshold distance and the filter loss for the given frequency exceeds a threshold filter loss when the filter loss is less than a predetermined filter loss value.

9. The method of claim 1, wherein the determined distance class is a distance class less than a threshold distance and the filter loss for the given frequency exceeds a threshold filter loss when the filter loss is greater than a predetermined filter loss value.

10. An radio access network (RAN) comprising:
    a transceiver configured to communicate signals between a mobile device and the RAN with a communication frequency;
    a filter configured to filter the signals communicated between the mobile device and the RAN; and
    a processor configured to:
    determine, for the communication frequency, a filter loss of the filter, wherein the filter has a varying degree of loss corresponding with frequency; and
    in response to the determining that the filter loss for the communication frequency exceeds a threshold filter loss: (i) reserve the communication frequency for use in communication between the RAN and at least one mobile device having a determined distance class, wherein the distance class is determined based on a distance between the at least one mobile device and the RAN, and (ii) communicate with the at least one mobile device using the communication frequency when the at least one mobile device has the determined distance class.

11. The RAN of claim 10, wherein the filter is a band-pass filter.

12. The RAN of claim 10, wherein the processor is further configured to determine a distance between the RAN and the mobile device.

13. The RAN of claim 12, wherein the determining is based on a received signal strength of either: (i) a signal received by the RAN from the mobile device, or (ii) a signal received by the mobile device from the RAN.

14. The RAN of claim 12, wherein the determining is based on a received location of the mobile device.

15. The RAN of claim 10, wherein the filter loss is greater than the threshold filter loss set by the network operator.

16. The RAN of claim 10, wherein the determined distance class is a distance class greater than a threshold distance and the filter loss for the given frequency exceeds a threshold filter loss when the filter loss is less than a predetermined filter loss value.

17. The RAN of claim 10, wherein the determined distance class is a distance class less than a threshold distance and the filter loss for the given frequency exceeds a threshold filter loss when the filter loss is greater than a predetermined filter loss value.

18. An article of manufacture including a non-transitory computer-readable medium having stored thereon program instructions that, if executed by a processor in a radio system, cause the radio system to perform operations comprising:
    determining, for a given frequency, a filter loss of the filter, wherein the filter has a varying degree of loss corresponding with frequency;
    in response to the determining that the filter loss for the given frequency exceeds a threshold filter loss, the RAN: (i) reserving the given frequency for use in communication between the RAN and at least one mobile device having a determined distance class, wherein the distance class is determined based on a distance between the at least one mobile device and the RAN, and (ii) communicating with the at least one mobile device using the given frequency when the at least one mobile device has the determined distance class.

19. The article of manufacture of claim 18, wherein the determined distance class is a distance class greater than a threshold distance and the filter loss for the given frequency exceeds a threshold filter loss when the filter loss is less than a predetermined filter loss value.

20. The article of manufacture of claim 18, wherein the determined distance class is a distance class less than a threshold distance and the filter loss for the given frequency exceeds a threshold filter loss when the filter loss is greater than a predetermined filter loss value.

\* \* \* \* \*